Figure 1:
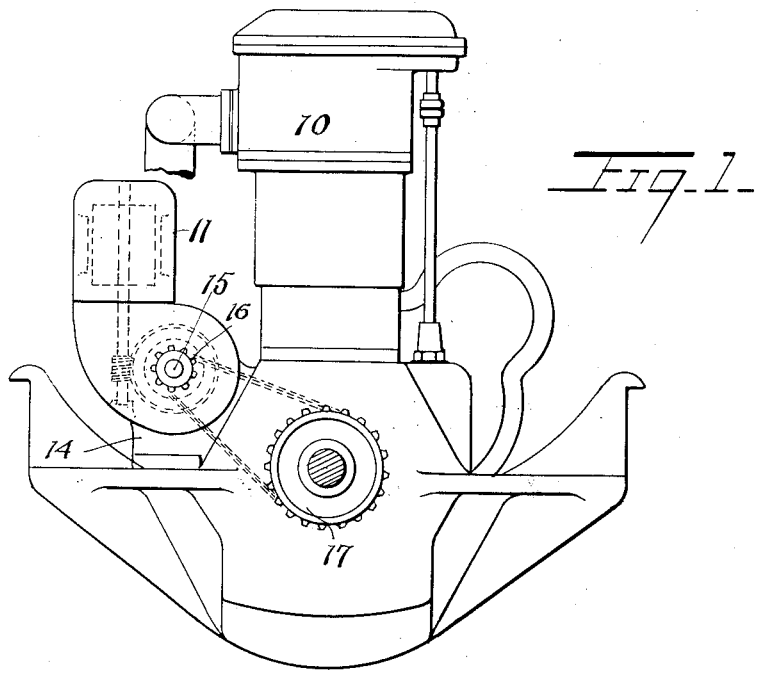

A. P. BRUSH.
ENGINE STARTING AND CURRENT GENERATING APPARATUS.
APPLICATION FILED JAN. 30, 1913.

1,211,072.

Patented Jan. 2, 1917.
2 SHEETS—SHEET 1.

Witnesses
E. B. Gilchrist
N. C. Hubbard

Inventor
Alanson P. Brush
by Thurston & Kwis
Attorneys

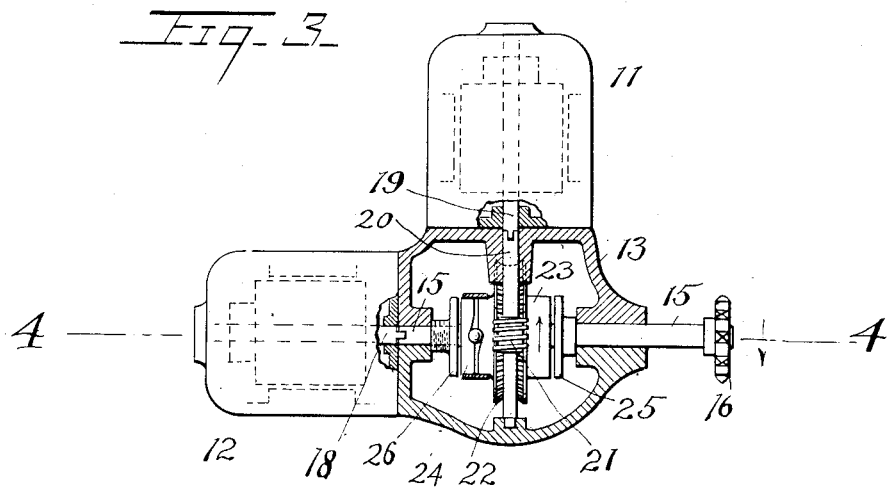
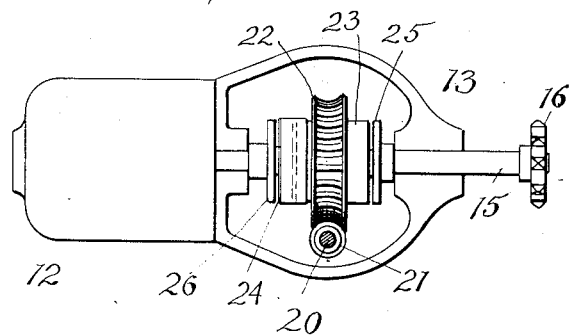

UNITED STATES PATENT OFFICE.

ALANSON P. BRUSH, OF FLINT, MICHIGAN.

ENGINE-STARTING AND CURRENT-GENERATING APPARATUS.

1,211,072. Specification of Letters Patent. Patented Jan. 2, 1917.

Application filed January 30, 1913. Serial No. 745,073.

*To all whom it may concern:*

Be it known that I, ALANSON P. BRUSH, a citizen of the United States, residing at Flint, in the county of Genesee and State of Michigan, have invented a certain new and useful Improvement in Engine-Starting and Current-Generating Apparatus, of which the following is a full, clear, and exact description.

This invention relates to engine starting and lighting or battery charging apparatus adapted particularly for use on motor driven vehicles.

It is customary at the present time to start the internal combustion engine of a motor vehicle and to generate current for lighting or battery charging purposes, either by a single dynamo electric machine or dynamo motor which serves as a motor to start the engine, and later is adapted to be driven as a generator; or by means of two separate and distinct electrical units, one a motor which is used to start the engine, and the other a generator which is driven by the engine and supplies current to the battery and lamps.

In carrying out the duplex plan above mentioned for starting and current generating purposes, it is customary and in fact the universal custom, as far as I am aware, to utilize between the crank shaft and the motor and generator respectively two separate and distinct driving or power transmitting mechanism or agencies. This has been considered desirable and necessary for various reasons, especially because the motor is in use only while it is turning over the engine, and for the further reason that it is desirable that the motor turn over the engine through gearing having considerable speed reduction and power multiplication, whereas the generator is preferably driven through its power transmitting mechanism at a speed relatively nearer to that of the engine. Consequently, the motor and generator have heretofore been connected or geared to the crank shaft at different points, and by different mechanisms, and have been separately mounted or supported, frequently being arranged on different sides of the engine.

The present invention relates to the type of apparatus employing separate motor and generator units, and has for its chief objects to obtain a more satisfactory and compact arrangement of parts, and to simplify the driving or power transmitting mechanism between the engine, motor and generator, and to so arrange the two electrical units that the wiring between the same and the battery can be much simplified.

Further, the invention aims to arrange the starting and generating apparatus, together with the principal part of the driving or power transmitting mechanism in a self contained substantially unitary structure, which can be readily attached to or detached from the engine, and which will have a single power transmitting connection with the engine.

In the attainment of the above objects in the manner preferred by me, I utilize for both the motor and the generator, a common driving or power transmitting shaft which is coupled or geared to the engine crank shaft at a single point only, and provide means by which power is transmitted from the crank shaft to the generator at a certain speed ratio, and power is transmitted from the motor to the crank shaft at a very much different speed ratio, the motor having a driving connection with the said shaft only so long as the shaft is driven by the motor. This is accomplished in the preferred embodiment of my invention by connecting the rotary part of the generator direct to the said common power transmitting shaft, and by connecting the rotary part of the motor to the shaft through a speed reduction gearing and a suitable ratchet mechanism which establishes driving or power transmitting connection between the shaft and the motor only when the shaft is being driven by the motor. In the preferred embodiment of my invention, the two electrical units, together with the common power transmitting shaft and the gearing and clutch or ratchet mechanism between the shaft and the motor are arranged in the form of a self-contained structure which as previously stated can be readily attached to or detached from the engine.

My invention may be further briefly summarized as consisting in certain novel details of construction and combinations and arrangements of parts which will be described in the specification and set forth in the accompanying claims.

Figure 2:
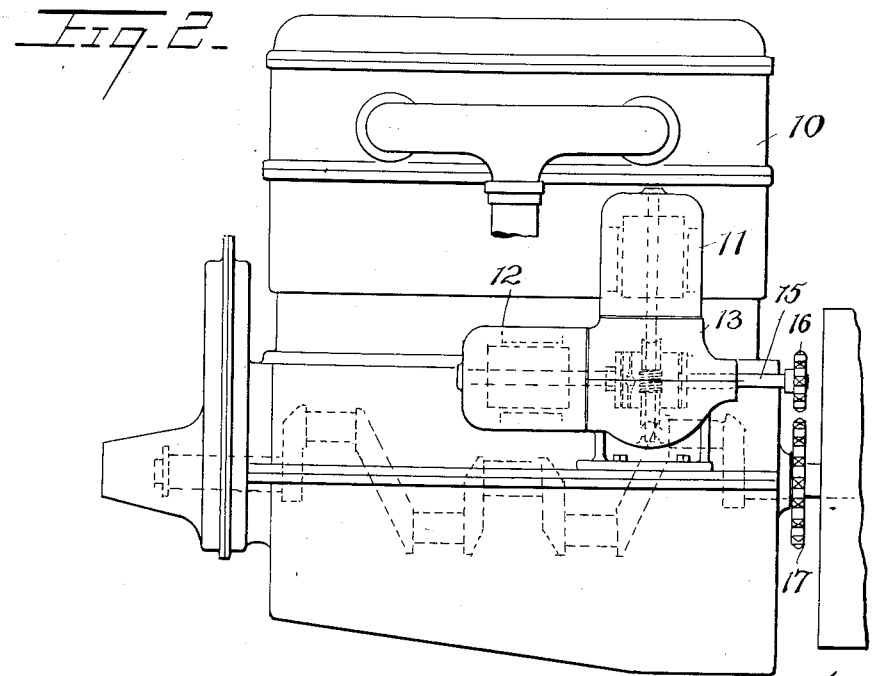

In the drawings, Figure 1 is an end view of the engine with the starting and current generating apparatus in operative relationship therewith, the view being taken through the crank shaft at a point between the engine and fly wheel; Fig. 2 is a side view of the same, with parts broken away and omitted; Fig. 3 is a side elevation of the self-contained starting and generating apparatus including the motor, generator and associated power transmitting and clutching mechanism, parts being in section; and Fig. 4 is a horizontal sectional view substantially along the line 4—4 of Fig. 3.

Referring now to the drawings, wherein I have shown an embodiment of my invention which answers the requirements very effectively, and with which I am enabled to attain the objects previously mentioned in a very satisfactory manner, 10 represents the internal combustion engine which may be of any construction, and is adapted particularly for use on motor vehicles, to the chassis of which it may be attached in a suitable manner. For starting the engine, I employ an electric motor 11, which is adapted to be supplied with current from the storage battery when turning over the engine; and for current generating purposes, i. e., for supplying current to the battery or to the lamps of the lighting system of the motor vehicle, I employ an electric generator or dynamo 12. It will be observed that these two electrical units are mounted upon a common support 13, which as will be explained presently constitutes an oil chamber, and an inclosing and supporting casing for certain parts of the driving mechanism. This supporting casing 13 may be mounted upon the engine at any suitable point, and in any desired manner, but as here shown, it is provided with a base or bracket 14 which is secured to the engine frame or casing. It will be observed also that the motor 11 is mounted upon the top of the support 13, with its shaft or axis extending vertically, and that the generator 12 is mounted upon the end of the support 13 with its axis or shaft extending horizontally. The motor and the generator may be bolted to the top and end respectively of the support 13.

Instead of utilizing two separate and distinct power transmitting agencies between the crank shaft and the motor and generator respectively, and instead of connecting the motor and generator to the crank shaft at different points, I utilize a power transmitting mechanism including a shaft 15, which is common to both the motor and generator, and is adapted when driven by the motor to transmit power to the crank shaft of the engine, and when driven by the engine to transmit power to the generator. This shaft 15 which is mounted in suitable bearings provided at the ends of the casing 13 may be coupled or geared to the crank shaft in various ways, but in this case, the shaft 15 is arranged parallel to the axis of the crank shaft and is connected thereto by chain and sprocket gearing, including a sprocket wheel 16 on the rear end of the shaft 15, and a larger sprocket wheel 17 on the crank shaft between the rear end of the engine and the fly wheel.

The shaft 15 and the shaft 18 of the generator 12 are in axial alinement, and are preferably connected directly together by any suitable driving connection. The shaft 18 and rotary element of the generator will be driven at the same rate of speed as the shaft 15, if a variable speed dynamo is to be used, or they may be driven at a substantial, constant or fixed speed if a constant speed dynamo is to be used.

In order that the motor shaft will be mechanically connected to the shaft 15, only while the motor is turning over the engine, and in order that the proper speed reduction may be obtained between the motor and the shaft 15, these two shafts are connected together by speed reduction gearing, and by a ratchet mechanism, all of which are inclosed within the chamber or casing 13, which can be provided with a suitable lubricant in which the driven parts may run. This is accomplished in the following manner: Arranged below and in vertical alinement with the shaft 19 of the motor is a shaft 20 which has a direct driving connection with the motor shaft 19, and which is mounted in suitable bearings at the top and bottom portions of the casing 13. This shaft 20 is adapted to drive the shaft 15 through the reduction gearing, and the ratchet mechanism previously referred to. The said gearing in this instance includes a worm 21 on the shaft 20, and a worm wheel 22 mounted coaxially with respect to the shaft 15, adapted to be clutched thereto, when the electric motor is the driving element, by a roller or friction ratchet. This ratchet mechanism, as will be seen by reference particularly to Figs. 3 and 4, includes an annular member 23, to which the worm wheel 22 is secured, and a second annular member 24 which, together with the member 23, are mounted loosely on the shaft 15 between a pair of annular relatively fixed abutments 25, 26, the former of which is preferably integral with the shaft 15, and the latter of which may be a separate member secured thereto. On the adjacent faces of the two annular members 23 and 24 are sets of inclined or tapered notches in which are located roller members, such as radial pins or balls, the whole being so arranged that when the member 23 is driven by the motor in the direction indicated by the arrow in Fig. 3, by reason of the cam action of the rollers on the inclined walls of the notches, said members 23 and 24 are spread apart and forced against the fixed abutments 25 and 26 on the shaft 15 with sufficient pressure to form driving engagement between the worm wheel 22 and the shaft 15. When, however, the shaft 15 is driven by the engine, the rollers move into the deeper portions of the notches, and the members 23 and 24 may move inwardly toward each other, and away from the abutments 25 and 26 so that the members 23 and 24 may slip on the shaft 15, and the worm gearing will not be driven. It is to be understood, however, that I do not limit myself to the worm gearing shown, or in fact to the vertical arrangement of the motor. It will be seen therefore that with the driving shaft which is common to both the motor and generator, the motor will turn over the engine and drive the shaft 15 at a certain relative rate of speed, or with a suitable reduction which may be, say, ten to one, while on the other hand, when the engine is operating under its own power, the generator is driven through the medium of this same shaft 15, and at the same time, the motor is unclutched or disconnected from the shaft 15. With this arrangement of motor and generator and with the power transmitting mechanism just described, not only do the motor and generator operate in a manner desired to produce the best results, but there is attained the desirable feature of compactness; much of the mechanism heretofore required is eliminated, and the number of parts is materially decreased; although I employ two separate electrical units, the entire starting and current generating apparatus, including the major portion of the power transmitting mechanism between the same and the engine is in the form of a self-contained unit or unitary structure, and with the motor and generator closely associated as is possible with my invention, the wiring and number of conductors can be very much simplified, especially as one terminal of the battery can be very easily connected to corresponding terminals of the motor and generator by means of a single conductor.

It will be understood that in installing on a motor vehicle a system embodying my invention, I may employ any suitable automatic and manually operated devices for controlling the operation of the motor and generator such as are in common use in electric starting and lighting systems.

Having thus described my invention, what I claim is:

1. In starting and lighting apparatus for a motor vehicle and in combination with the internal combustion engine thereof, a starting motor and a lighting generator in the form of a self-contained unit and power transmitting mechanism for both elements of the unit having a single connection with the crank shaft of the engine.

2. In starting and lighting apparatus for a motor vehicle and in combination with the engine thereof, a starting motor and a lighting generator in the form of a unitary structure or self-contained unit, power transmitting mechanism for both parts of the unit and including an element having a single driving connection with the crank shaft of the engine, and clutch mechanism between the motor and said element.

3. In starting and lighting apparatus for a motor vehicle and in combination with the engine thereof, a starting motor and a lighting generator in the form of a unitary structure or self-contained unit, a single support by which said unit is supported on the vehicle in a fixed position with reference to the engine, and power transmitting mechanism for both the motor and generator having a single driving connection with the crank shaft of the engine.

4. In combination with the engine of a motor vehicle, engine starting and lighting apparatus for the vehicle, including a motor, a generator and a driving shaft for both the motor and generator, all said parts being in the form of a unitary structure adapted to be applied as a unit to the vehicle, said shaft having a single driving connection with the crank shaft of the engine, and the motor being connected to the shaft by a one-way driving clutch.

5. In combination with the engine of a motor vehicle, engine starting and lighting mechanism for the vehicle and including a starting motor, a lighting generator and power transmitting means for both the motor and generator, said power transmitting means having a single driving connection with the crank shaft of the engine, and said motor, generator and power transmitting means being in the form of a unitary structure having a common support and adapted to be applied as a unit to the vehicle and to be supported thereby in definite relationship with respect to the engine.

6. In combination with the engine of a motor vehicle, engine starting and vehicle lighting apparatus including a motor, a generator, and a power transmitting mechanism having a single driving connection with the crank shaft of the engine, the motor being connected to said power transmitting mechanism between the generator and the point of connection with the engine crank shaft.

7. In combination with the engine of a motor vehicle, a starting and lighting apparatus including a motor, a generator, and a power transmitting mechanism for both the motor and generator having a single power transmitting connection with the engine, said motor and generator being in the form of a unit, and means for supporting said unit on the engine.

8. In combination with the engine of a motor vehicle, a starting and lighting apparatus including a motor, a generator, and a power transmitting mechanism for both the motor and generator having a single power transmitting connection with the engine, said motor, generator and power transmitting mechanism being in the form of a unit, and means for supporting said unit at the side of the engine.

9. In starting and lighting apparatus for motor vehicles and in combination with the internal combustion engine thereof, a motor, a generator and power transmitting mechanism connecting the engine crank shaft to both the motor and the generator, said power transmitting mechanism including a shaft which is common to both the motor and generator, and a common support for the shaft, motor and generator by which said unit is supported on the vehicle in fixed relationship with respect to the engine.

10. In combination with an internal combustion engine, an electric starting and lighting apparatus including a motor, a generator, power transmitting mechanism between the engine and motor and generator respectively, comprising a shaft connected to the engine and to the generator, and connecting means between the shaft and the motor including speed reduction gearing and clutching mechanism by which driving relationship is established between the motor and shaft only when the shaft is driven by the motor, an inclosing casing for the said gearing and clutching mechanism, said motor, generator and power transmitting mechanism being in the form of a unitary structure adapted to be applied to and supported as a unit in fixed relationship with respect to the engine.

11. An electric starting and current generating apparatus for use with internal combustion engines comprising a supporting member, a shaft rotatably mounted in said member, a motor and a generator both connected to said supporting member, said shaft being in alinement with and having a direct connection with the rotary element of the generator, and speed reduction gearing, and a ratchet driving mechanism between said shaft and the rotary element of the motor, said gearing and ratchet driving mechanism being incased in said supporting member.

In testimony whereof, I hereunto affix my signature in the presence of two witnesses.

ALANSON P. BRUSH.

Witnesses:
W. L. McGARRELL,
A. F. KWIS.